(12) United States Patent
Klein et al.

(10) Patent No.: US 10,417,265 B2
(45) Date of Patent: Sep. 17, 2019

(54) HIGH PERFORMANCE PARALLEL INDEXING FOR FORENSICS AND ELECTRONIC DISCOVERY

(71) Applicant: SAP SE, Walldorf (DE)

(72) Inventors: Udo Klein, Eggenstein-Leopoldshafen (DE); Philipp Scholl, Mannheim (DE)

(73) Assignee: SAP SE, Walldorf (DE)

( * ) Notice: Subject to any disclaimer, the term of this patent is extended or adjusted under 35 U.S.C. 154(b) by 361 days.

(21) Appl. No.: 15/351,733

(22) Filed: Nov. 15, 2016

(65) Prior Publication Data

US 2018/0137115 A1    May 17, 2018

(51) Int. Cl.
    *G06F 7/00*     (2006.01)
    *G06F 17/30*    (2006.01)
    *G06F 16/31*    (2019.01)

(52) U.S. Cl.
    CPC .......... *G06F 16/313* (2019.01); *G06F 16/325* (2019.01)

(58) Field of Classification Search
    CPC .... G06F 16/313; G06F 16/325; G06F 16/358; G06F 16/93; G06F 16/335; G06F 17/30864; G06F 17/30713; G06F 17/30699
    See application file for complete search history.

(56) References Cited

U.S. PATENT DOCUMENTS

| | | | |
|---|---|---|---|
| 9,361,458 B1 * | 6/2016 | Feng | G06F 21/564 |
| 2007/0239702 A1 * | 10/2007 | Vassilvitskii | G06F 17/30864 |
| 2016/0188590 A1 * | 6/2016 | Cole | G06F 17/3087 707/747 |

OTHER PUBLICATIONS

NUIX, "Extend Your Dominance Over Data," NUIX 6.2 Fact Sheet. 2015.
Oliver, Jonathan, Chun Cheng, and Yanggui Chen. "TLSH—A Locality Sensitive Hash." Cybercrime and Trustworthy Computing Workshop (CTC), 2013 Fourth. 2013.
Rajaraman, Anand. "Near Neighbor Search in High Dimensional Data (1)." Stanford. N.p., n.d. Web. <http://web.stanford.edu/class/cs345a/slides/04-highdim.pdf>.
Ullman, Jeffrey D. "Chapter 3: Finding Similar Items." N.p., n.d. Web. <http://infolab.stanford.edu/~ullman/mmds/ch3a.pdf>.
Van Durme, Benjamin, and Ashwin Lall. "Online generation of locality sensitive hash signatures." Proceedings of the ACL 2010 Conference Short Papers. Association for Computational Linguistics, 2010.
Wikipedia contributors. "Locality-sensitive hashing." Wikipedia, The Free Encyclopedia. Wikipedia, The Free Encyclopedia, Nov. 2, 2016. Web.

* cited by examiner

*Primary Examiner* — Azam M Cheema
(74) *Attorney, Agent, or Firm* — Mintz Levin Cohn Ferris Glovsky and Popeo, P.C.

(57) ABSTRACT

A system, a method and a computer program product for indexing data samples are disclosed. A locality-sensitive string hash index is determined for each data sample in a plurality of data samples. The determined locality-sensitive string hash indexes for at least two data samples in the plurality of data samples are compared. The comparison includes estimating, based on the determined locality-sensitive string hash indexes, a distance between the two data samples. Based on the comparison, at least one data sample in the plurality of data samples being similar to at least another data sample in the plurality of data samples is identified.

15 Claims, 11 Drawing Sheets

HIGH PERFORMANCE PARALLEL INDEXING FOR FORENSICS AND ELECTRONIC DISCOVERY

TECHNICAL FIELD

This disclosure relates generally to data processing and, in particular, to parallel indexing and document tracking in communications for the purposes of electronic discovery and/or forensic investigation(s).

BACKGROUND

Today, many companies and individuals rely on software applications in conducting their daily activities. The software applications include email, word processing applications, internet browsing applications, financial software applications, sales applications, and/or many other types of applications. Software is typically used by individuals to perform a variety of tasks and can involve vast amounts of data being generated, exchanged, manipulated, stored, etc. Periodically, data is subject to electronic discovery and can be requested for review, analysis, etc. such as, during a governmental investigation, a lawsuit, etc.

The data is typically received by way of a data dump and can be stored in a memory location. Typically, the amounts of data that are dumped in response to requests from investigators can measure in hundreds of terabytes and can include hundreds of millions of emails, documents, etc. Searching and/or analyzing such vast amounts of data are a highly difficult and extremely time-consuming task. As part of the analysis, the investigators may need to do a plain search of the data using known or random keywords, determine which data is similar to another data, track lifecycle of data, etc. Most conventional solutions are not capable of performing all of these tasks or perform them in very slow manner. This may be unacceptable to the investigators or those who may be seeking to obtain results of the investigation in an expedited manner. Thus, there is a need to provide a data indexing system that can reduce the amount of data that needs to be analyzed for the purposes of determining similar documents, performing keyword searches, ascertaining lifecycle of data, and/or performing any other analysis.

SUMMARY

In some implementations, the current subject matter relates to a computer-implemented method for indexing data samples. The method can include determining a locality-sensitive string hash index for each data sample in a plurality of data samples, comparing determined locality-sensitive string hash indexes for at least two data samples in the plurality of data samples, where the comparison can include estimating, based on the determined locality-sensitive string hash indexes, a distance between two data samples, and identifying, based on the comparing, at least one data sample in the plurality of data samples being similar to at least another data sample in the plurality of data samples. At least one of the determining, the comparing, and the identifying can be performed on at least one processor of at least one computing system.

In some implementations, the current subject matter can include one or more of the following optional features. The method can also include generating an inverted word index for each data sample in the plurality of data samples, and executing, based on at least one keyword, at least one query for searching the plurality of data samples. The execution can include determining whether the keyword is included in the generated inverted word index.

In some implementations, at least one of the determining, the comparing, and the identifying can be performed using at least one distributed computing system.

In some implementations, the determination of a locality sensitive string hash index can include parsing the plurality of data samples, lemmatizing the parsed plurality of data samples, determining, based on the lemmatizing, at least one token corresponding to at least one lemma associated with the plurality of data samples, hashing, using the tokens, the plurality of parsed plurality of data samples, and identifying, based on the determining and the hashing, at least two similar data samples in the plurality of data samples.

In some implementations, the plurality of data samples can include at least one of the following: data, metadata, structured data, unstructured data, documents, email messages, text files, video, audio, graphics, and any combination thereof.

In some implementations, the method can also include generating a lifecycle graph for each data sample based on the estimated distances between the two data samples. The method can further include determining metadata associated with the two data samples, and refining the generated lifecycle graph based on the determined metadata. The metadata can include at least one of the following: a time stamp information, a recipient information, a sender information, a data sample format, a hidden content metadata, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide parallel indexing and document tracking in communications for the purposes of electronic discovery and/or forensic investigation(s).

In some implementations, the current subject matter can perform analysis of a plurality of data samples to determine whether any of the samples may be similar to one another, more and/or less similar to other sample, and/or dissimilar. The current subject matter system can receive a plurality of data samples, which, for example, can include data, metadata, structured content data, unstructured content data, documents as email messages, text files, video, audio, graphics, etc. The data samples can be obtained from a variety of sources, which can include at least one of the following: containers of data, hard disks, cellular telephone memories, memory cards, main memory images, forensic containers, zip files, files, memory images, and/or any other sources. For ease of the following discussion, data samples will be referred to as documents, however, as can be understood, any of the above or other data samples can be used. Optionally, an inverted word index can be computed for the received documents. This can allow searching for documents in response various standard search queries (e.g., given one or more keywords and/or words from a dictionary (e.g., a white and/or a black list), the search query can seek to determine which documents contain such keywords and/or words from the dictionary). To determine whether any documents are similar to one another, the current subject matter system can compute a locality-sensitive string hash ("LSH") for each document. The LSH can be of a predetermined size. Using the LSH, the current subject matter can ascertain which documents are similar to one another. The computation of LSHs and their importation into one or more computing nodes (i.e., cluster(s)) that process the document hashes can be performed in a distributed fashion. Once processed, the distributed hashes can be aggregated into a centralized database instance for further analysis (e.g., by an investigator) and may serve to be a space-efficient representation of the documents without granting access to the actual document.

In some implementations, the current subject matter can also generate a document lifecycle graph by determining which documents are closest to other documents in terms of edit distance and/or a Jaccard index. Various metadata relating to the documents can be used to revise the lifecycle graph. Additionally, use of a document timestamp can provide a timeline and further revise the lifecycle graph.

Figure 1:
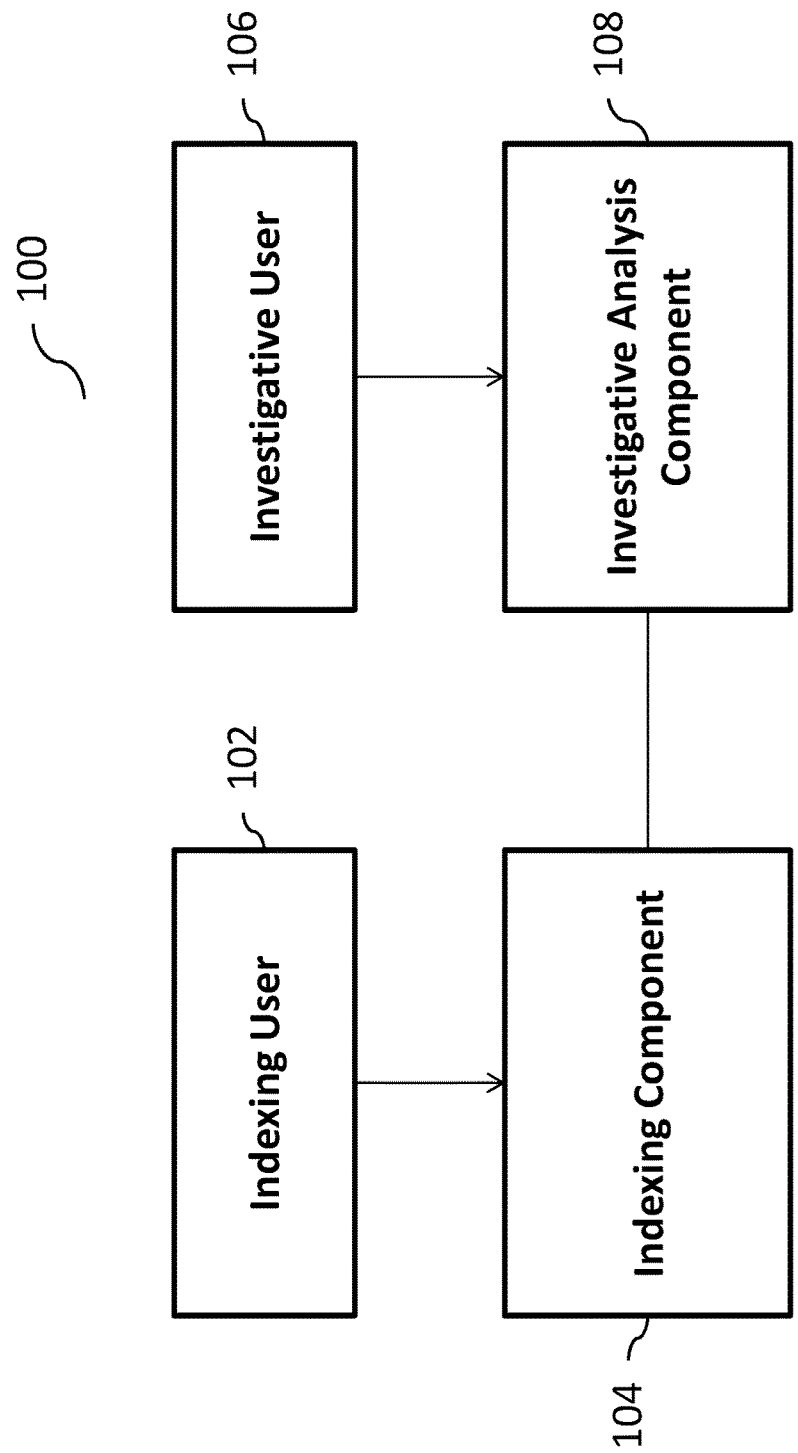
FIG. 1 illustrates an exemplary system for indexing data, according to some implementations of the current subject matter.

FIG. 1 illustrates an exemplary system 100 for indexing data, according to some implementations of the current subject matter. The system 100 can include an indexing component 104 communicatively coupled with an investigative analysis component 108. An indexing user 102 can access the indexing component 104 for the purposes of indexing of data (e.g., documents, emails, video, audio, text files, etc.). An investigative user 106 can access the investigative analysis component 108 for the purposes of analyzing data provided by the indexing component 104. The indexing component 104 can be communicatively coupled to the investigative analysis component 108 using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The indexing component 104 and/or investigative analysis component 108 can include any combination of hardware and/or software. In some implementations, the components 104, 108 can be disposed on one or more computing devices, such as, server(s), database(s), personal computer(s), laptop(s), cellular telephone(s), smartphone(s), tablet computer(s), and/or any other computing devices and/or any combination thereof. In some implementations, the components 104, 108 can be disposed on a single computing device and/or can be part of a single communications network. Alternatively, the components can be separately located from one another.

The indexing user 102 can access the indexing component 104 via a network, such as a network described above. The investigative user 106 can access the investigative analysis component 108 using a similar network. The users 102 and 106 can be a single user and/or can be different users. The users 102, 106 can be individual users, computing devices, software applications, objects, functions, and/or any other types of users and/or any combination thereof. The user 102 can generate an instruction/command to the forensic indexing component 104 for the purposes of indexing data. The instruction/command can be in a form of a query, a function call, and/or any other type of instruction/command. In some implementations, the instructions/commands can be provided using a microphone (either a separate microphone or a microphone imbedded in the user's computing device), a speaker, a screen (e.g., using a touchscreen, a stylus pen, and/or in any other fashion), a keyboard, a mouse, a camera, a camcorder, and/or using any other device. The user 102 can also instruct the indexing component to provide data that has been indexed to the investigative analysis component 108 for further analysis and/or review by the component 108 and/or the investigative user 106.

In some implementations, the current subject matter system, as part of its indexing processes, can determine similarities among documents contained in a large pool of documents that may have been obtained through digital investigations and/or any other document discovery processes. The documents can be obtained electronically, manually scanned (and/or converted into a searchable format), and/or otherwise uncovered and presented to investigators for indexing and/or analysis. For example, in a typical business fraud case, a forfeiture of all emails of a company can result in a large number of documents being obtained. As a result, investigators may be challenged to index and analyze many millions of emails (or more) for evidence and hundreds of terabytes of data.

While some existing solutions can achieve indexing speeds of 2-3 megabytes per second to approximately 200-300 megabytes per second, it would usually require about one week per terabyte of data to pre-process the obtained data, which would not include any analysis. Additionally, such pre-processing speeds would typically require use of powerful hardware that can be costly and not always available. This can lead to unacceptable delays and resource containment on the side of the investigators.

In some implementations, the current subject matter system can provide an effective document indexing solution that can assist investigators in document analysis. For example, using the indexed documents, investigators can input keywords and/or other dictionary words (e.g., a black list of keywords, a white list of keywords, etc.). Further, based on the indexed documents, investigators can determine which documents in the obtained documents are similar to a particular document and/or determine a cluster of documents that may be similar to one another (or, alternatively, less similar to one another). An inverted index can be computed for the obtained documents to enable searching of documents using keywords. Further, similarity/clustering approach, while identifying documents that may be similar to other documents, can also provide information about history of one or more documents, including, for example, recipients of documents, how the document was edited, when it was edited, by whom it was edited, etc.

The current subject matter's similarity/clustering approach can provide investigators with an ability to efficiently reduce a number of candidate documents for initial investigation even without any prior knowledge of what they may be searching for. A decentralized indexing approach can be used to perform similarity/clustering of documents.

Figure 2:
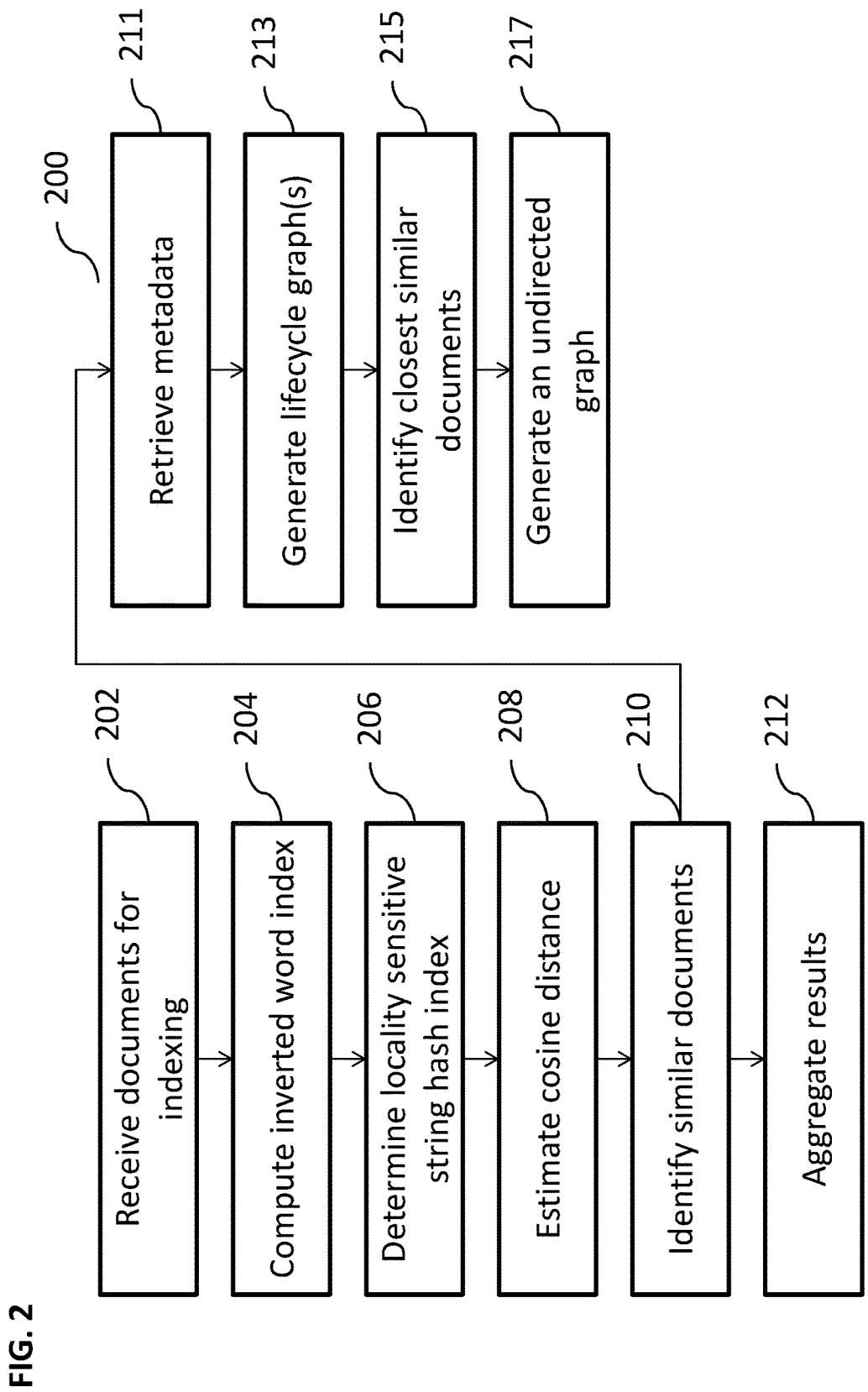
FIG. 2 illustrates an exemplary process for indexing documents in a plurality of documents, according to some implementations of the current subject matter.

FIG. 2 illustrates an exemplary process 200 for indexing documents in a plurality of documents, according to some implementations of the current subject matter. At 202, the plurality of documents can be received for indexing. The documents can be received by an exemplary indexing system 300 shown in FIG. 3. The system 300 can include a master node 302 and a plurality of worker nodes 304 that can be communicatively coupled to the master node 302. The worker nodes 304 can be coupled to the master node 302 using one or more communications networks. The communications networks can include at least one of the following: a wired network, a wireless network, MAN, LAN, WAN, VLAN, an internet, an extranet, an intranet, and/or any other type of network and/or any combination thereof. The nodes 302, 304 can include any combination of hardware and/or software. In some implementations, the nodes 302, 304 can be disposed on one or more computing devices, such as, server(s), database(s), personal computer(s), laptop(s), cellular telephone(s), smartphone(s), tablet computer(s), and/or any other computing devices and/or any combination thereof. The master node 302 can distribute processing tasks to one or more worker nodes 304. For example, as discussed below, computation of indexes, clustering/similarity determination, etc. can be distributed to one or more worker nodes 304.

Referring back to FIG. 2, at 204, an inverted word index can be computed for the documents that have been received. The inverted word index can be computed using any known techniques. While this may be optional, the inverted word index can be used to assist investigators with standard search queries that may rely on a particular list of keywords (e.g., a white list of keywords, a black list of keywords, etc.). As stated above, computation of the inverted word index can be distributed to the worker nodes 304 to reduce an overall processing load on the system 300.

At 206, for the purposes of determining similarity and/or clustering of documents, a locality-sensitive string hash ("LSH") index can be determined for each document. Locality-sensitive hashing can reduce dimensionality of high-dimensional data. LSH hashes input items so that similar items (e.g., documents and/or portions of documents) can map to the same "buckets" with high probability (where a number of buckets can be smaller than the number of possible input items). LSH hash can involve generating an abstraction, i.e., a hash, of a document. The computed hash of a document can be characterized by a high probability of being similar to hashes corresponding to other document if the documents themselves are similar. In some exemplary, non-limiting implementations, the hashes can have a size of 256 bit (or 32 bytes per document). In some implementations, a family of hash functions can be used, such as TLSH, Nilsimsa Hash and/or MinHash, and/or any others. In some implementations, LSH indexing does not require any special knowledge about the documents, except for algorithm parameters such as, hash size, number of hash functions, shingle size, and/or any others, and documents to be processed. There is no requirement to know contents of any other documents. Thus, the documents can be processed entirely independently from one another. Further, the documents can be imported and hashed in a distributed fashion, such as using system 300 shown in FIG. 3. At 208, a cosine distance between documents can be estimated based on the computed hashes. Cosine distance or cosine similarity is a measure of similarity between two non-zero vectors of an inner product space that measures a cosine of an angle between them. The cosine similarity can be used to determine how close two documents are to each other by computing a cosine function of an angle between two vectors representing the documents (e.g., corresponding to word counts). The result of the computed function can be in a space of [0, 1], where 1 can represent an identical match between two documents and 0 can represent complete dissimilarity of documents. At 210, based on the result of the computed cosine distance, similar documents can be identified. The process 200 can be pushed to the worker nodes 304 (shown in FIG. 3) and can reduce the amount of data that needs to be processed. For example, a 100 million document database can require only 3.2 gigabytes to store the hash values.

Figure 3:
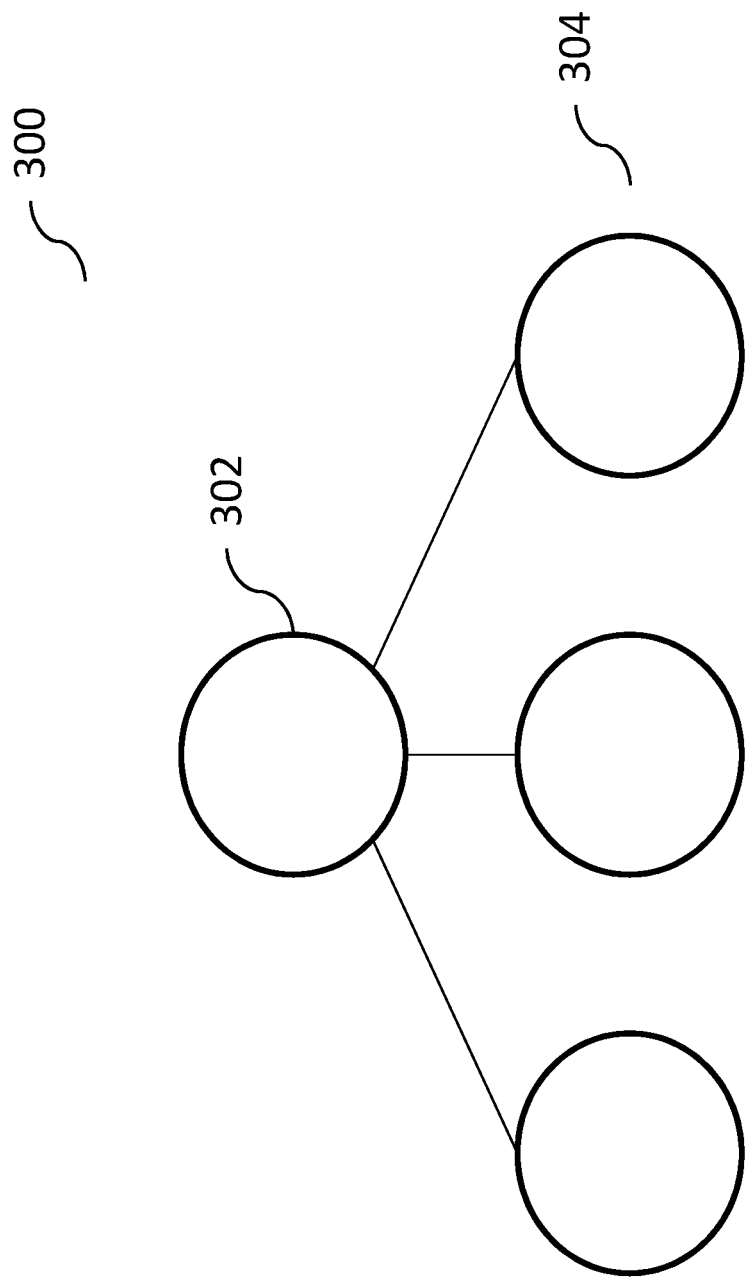
FIG. 3 illustrates an exemplary indexing system, according to some implementations of the current subject matter.
Figure 4:
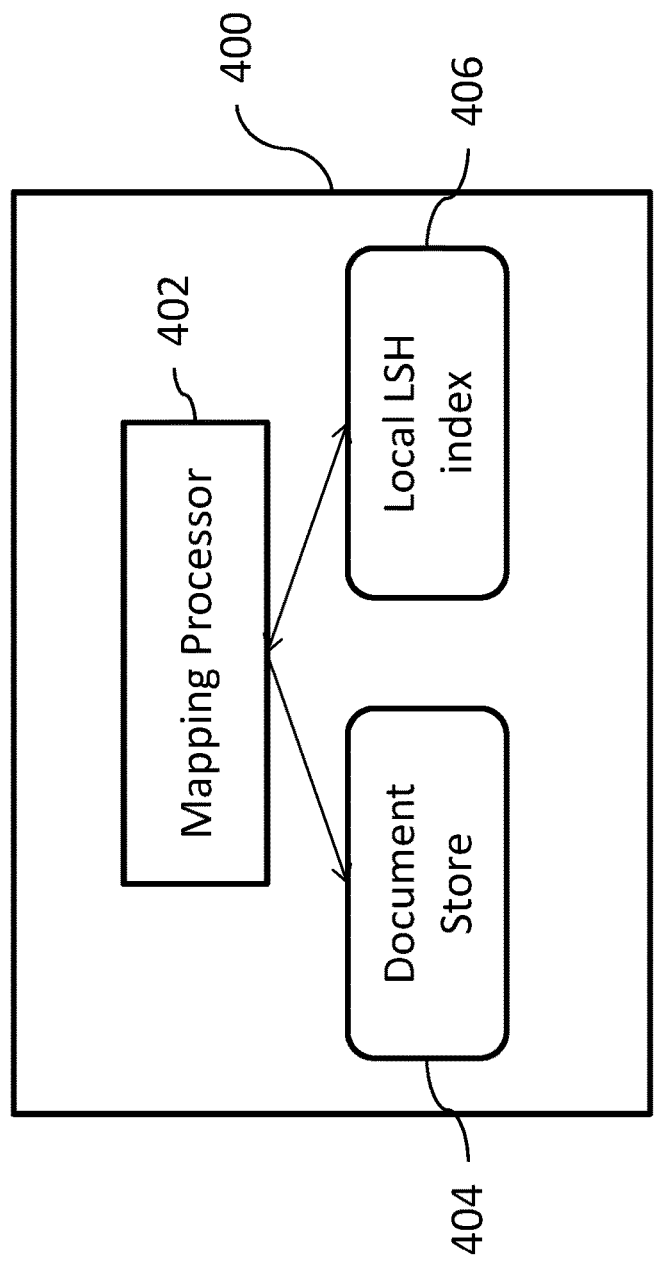
FIG. 4 illustrates an exemplary mapping processor that can be used for importing and hashing process in a cluster, according to some implementations of the current subject matter.

FIG. 4 illustrates an exemplary mapping processor 402 that can be used for importing and hashing process (e.g., a mapping process) in a cluster, according to some implementations of the current subject matter. The processor 402 can be implemented in the system 300 and can be disposed on any of the worker nodes 304, as shown in FIG. 3. The processor 402 can be disposed in a cluster node 400 and can generate LSH indexing for the documents that may be stored in a document store 404, which can be any memory location. The processor 402 can access the document store 404 and, for each document that is imported into the cluster node 400, can compute a local LSH index 406.

Figure 5:
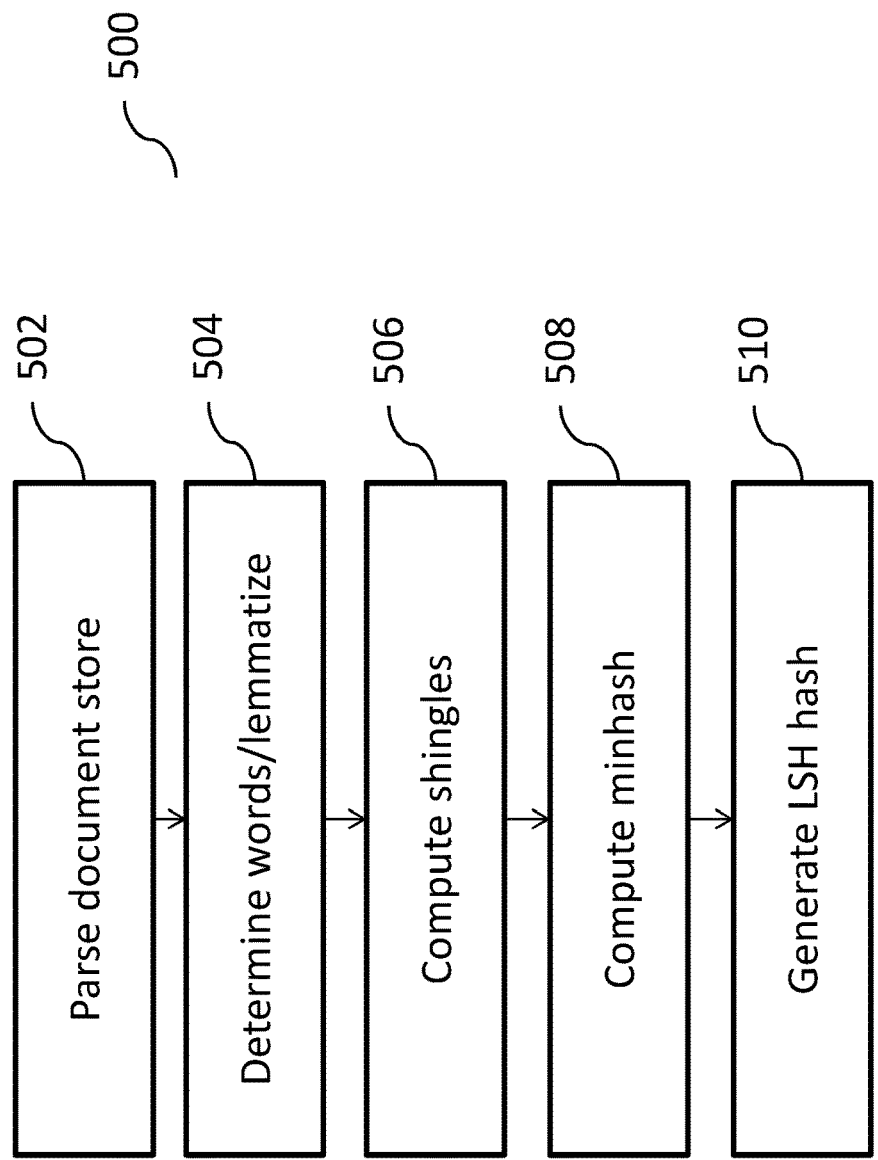
FIG. 5 illustrates an exemplary process performed by the mapping processor shown in FIG. 4 in importing and hashing documents, according to some implementations of the current subject matter.

FIG. 5 illustrates an exemplary process 500 performed by the mapping processor 402 shown in FIG. 4 in importing and hashing documents, according to some implementations of the current subject matter. At 502, the mapping processor 402 can perform parsing of the document store 404. At 504, based on the parsed document store, the mapping processor 402 can determine words and/or lemmatize the documents. Lemmatization can be a process of determining a lemma of a set of words in a document (i.e., a canonical form, a dictionary form, a citation form, etc. of a set of word). At 506, the processor 402, based on the determined lemmata, can compute shingles. Shingles can be contiguous subsequences of tokens (i.e., corresponding to the determined lemmata) in a document that can be used to gauge similarity between two documents. At 508, a minhash can be computed by the processor 402 for each document in the parsed document store. Minhash or a min-wise independent permutations locality sensitive hashing scheme can be used to quickly estimate how similar two documents are. At 510, a LSH hash can be generated by the processor 402. The process 500 can be performed by the worker nodes 304 without any centralized support.

Referring back to FIG. 2, at 212, the current subject matter system can aggregate the results of the mapping processes (i.e., LSH hashes) into a centralized database instance (e.g., SAP HANA, as available from SAP SE, Walldorf, Germany). Alternatively, the results of mapping processes can be further processed, such as by performing further hashing/importing, etc.

In some implementations, the current subject matter can also perform tracking of documents/information. This can be useful for tracking of documents exchanged as part of communications, modifications, alterations, deletions, etc. by one or more users, and/or for any other purposes. In particular, during investigations of business crimes, it may be important to not only track original documents but modifications made to them, such as for example, when a business report is altered to sustain some fraud. Thus, the current subject matter can allow investigators to generate a query in order to determine and/or show a path of a specific document that may have been exchanged/communicated/ etc. between various parties as well as any alterations that were made to the document. Existing solutions, while offering some limited forensic capabilities, are typically unable to deal with the amount of data involved and/or are lacking sufficient analytic capabilities to analyze a desired document flow. The current subject matter system can determine an entire communication path and/or any alterations made to the document during its lifecycle.

In some implementations, for the purposes of tracking documents/information, the current subject matter system can process all relevant documents, including any communications with documents (attached and/or separately existing), emails, messages, images, graphics, text, video, audio, etc. The documents can exist in a dump of an exchange mail storage of one and/or many companies, other means of communication and/or document storage repositories, etc. and/or any combinations thereof. The current subject matter can analyze the documents and/or any metadata that may be associated with the documents and/or separately existing (e.g., millions, billions, etc. of documents).

Referring back to FIG. 2, once some or all reasonably similar documents are determined (at 210), similar documents' metadata can be retrieved, at 211. The metadata can include at least one of the following: a time stamp(s) information (e.g., creation, modification, deletion, purging, etc.), recipient(s) information, sender(s) information, format (s), hidden content metadata, etc., and/or any combination thereof.

At 213, one or more lifecycle graphs for the similar documents can be generated. At 215, the closest similar documents can be identified using an edit distance (i.e., a way of quantifying how dissimilar two strings (e.g., words) are to each other by counting a minimum number of operations required to transform one string into the other) and/or Jaccard index (or a Jaccard coefficient which corresponds to a measurement of similarity between finite sample sets and is defined as the size of the intersection divided by the size of the union of the sample sets). At 217, documents that are found to be closest matches can be represented as an undirected graph. A relation between the documents can be asymmetric.

Figure 6:
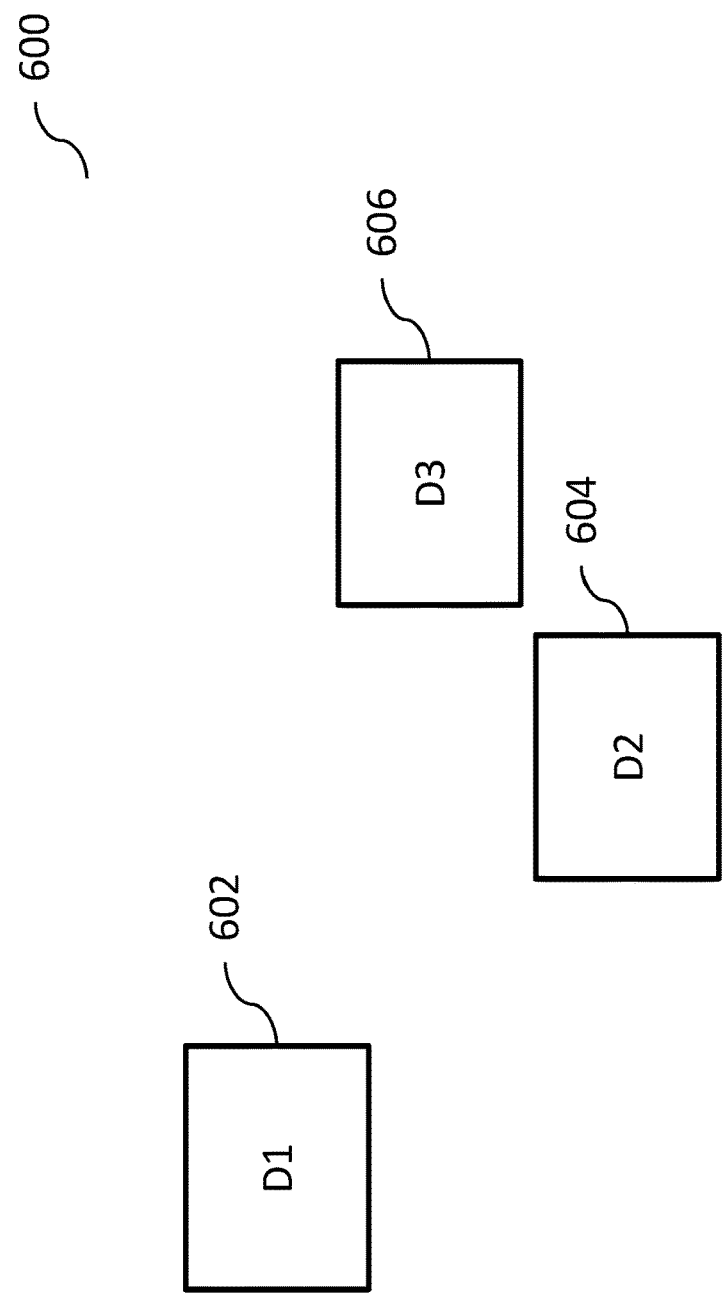
FIG. 6 illustrates an exemplary lifecycle graph, according to some implementations of the current subject matter.

FIG. 6 illustrates an exemplary lifecycle graph 600, according to some implementations of the current subject matter. The graph 600 can include document D1 602, document D2 604, and document D3 606. As shown in FIG. 6, document D2 can be the closest match to D3 but document D1 is not the closest match to D2.

In some implementations, recipient(s) and/or sender(s) metadata and/or any other metadata, if available, can be used to enrich and/or refine the constructed graph, at 219. In case of recipient/sender metadata, such metadata can provide an insight into how, when, by whom, etc. the documents were exchanged/communicated. This information might be difficult to ascertain using distance metrics. For example, as shown by the lifecycle graph 700 in FIG. 7, a document may be forwarded from individual A 702 to individual B 704 without any changes. This can be detected by inspecting document metadata, e.g., by analyzing an e-mail header information and/or by inferring from information similarity and/or containment of two versions of documents. However, analysis of distance metrics along might not determine the direction of the communication (i.e., from A to B). Further, the constructed graph can be augmented with a timestamp information. The timestamp can indicate when the document was sent, when it was received, opened, forwarded, modified, deleted, purged, etc.

Figure 7:
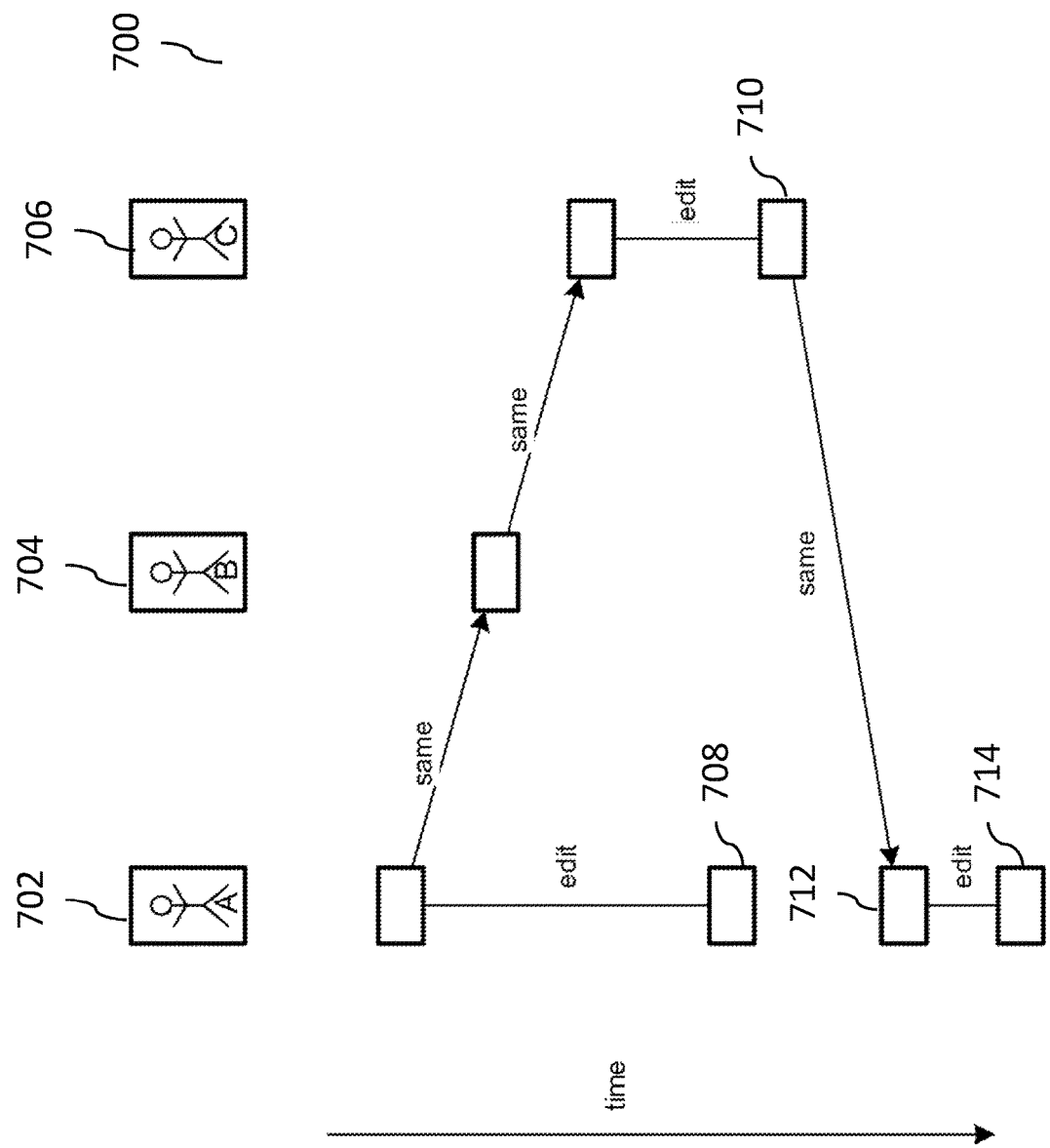
FIG. 7 illustrates an exemplary lifecycle graph, according to some implementations of the current subject matter.

As shown in FIG. 7, a document can be sent from individual A to individual B and then to individual C 706. Both A and C edit the documents that they have (as shown by 708 and 710, respectively). Then, C sends the edited document to A (as shown by 712), at which point A also edits it (as shown by 714). While the graph 700 does not indicate that A may have merged the original document, edited document 708, or the document it received from C, however, the metadata that may have been collected can indicate that as well.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 8:
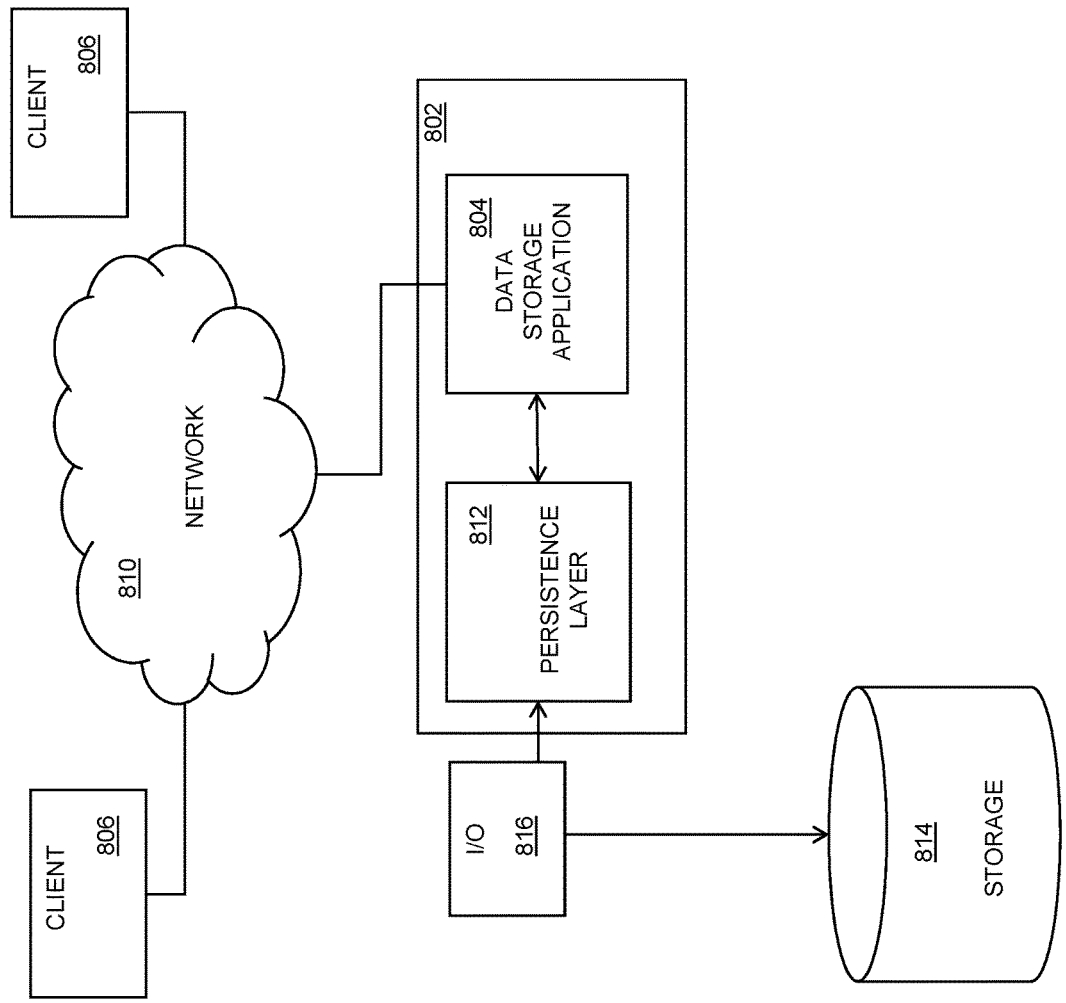
FIG. 8 is a diagram illustrating an exemplary system including a data storage application, according to some implementations of the current subject matter.

FIG. 8 illustrates an exemplary system 800 in which a computing system 802, which can include one or more programmable processors that can be collocated, linked over one or more networks, etc., executes one or more modules, software components, or the like of a data storage application 804, according to some implementations of the current subject matter. The data storage application 804 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 802 as well as to remote users accessing the computing system 802 from one or more client machines 806 over a network connection 810. One or more user interface screens produced by the one or more first modules can be displayed to a user, either via a local display or via a display associated with one of the client machines 806. Data units of the data storage application 804 can be transiently stored in a persistence layer 812 (e.g., a page buffer or other type of temporary persistency layer), which can write the data, in the form of storage pages, to one or more storages 814, for example via an input/output component 816. The one or more storages 814 can include one or more physical storage media or devices (e.g. hard disk drives, persistent flash memory, random access memory, optical media, magnetic media, and the like) configured for writing data for longer term storage. It should be noted that the storage 814 and the input/output component 816 can be included in the computing system 802 despite their being shown as external to the computing system 802 in FIG. 8.

Data retained at the longer term storage 814 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 9:
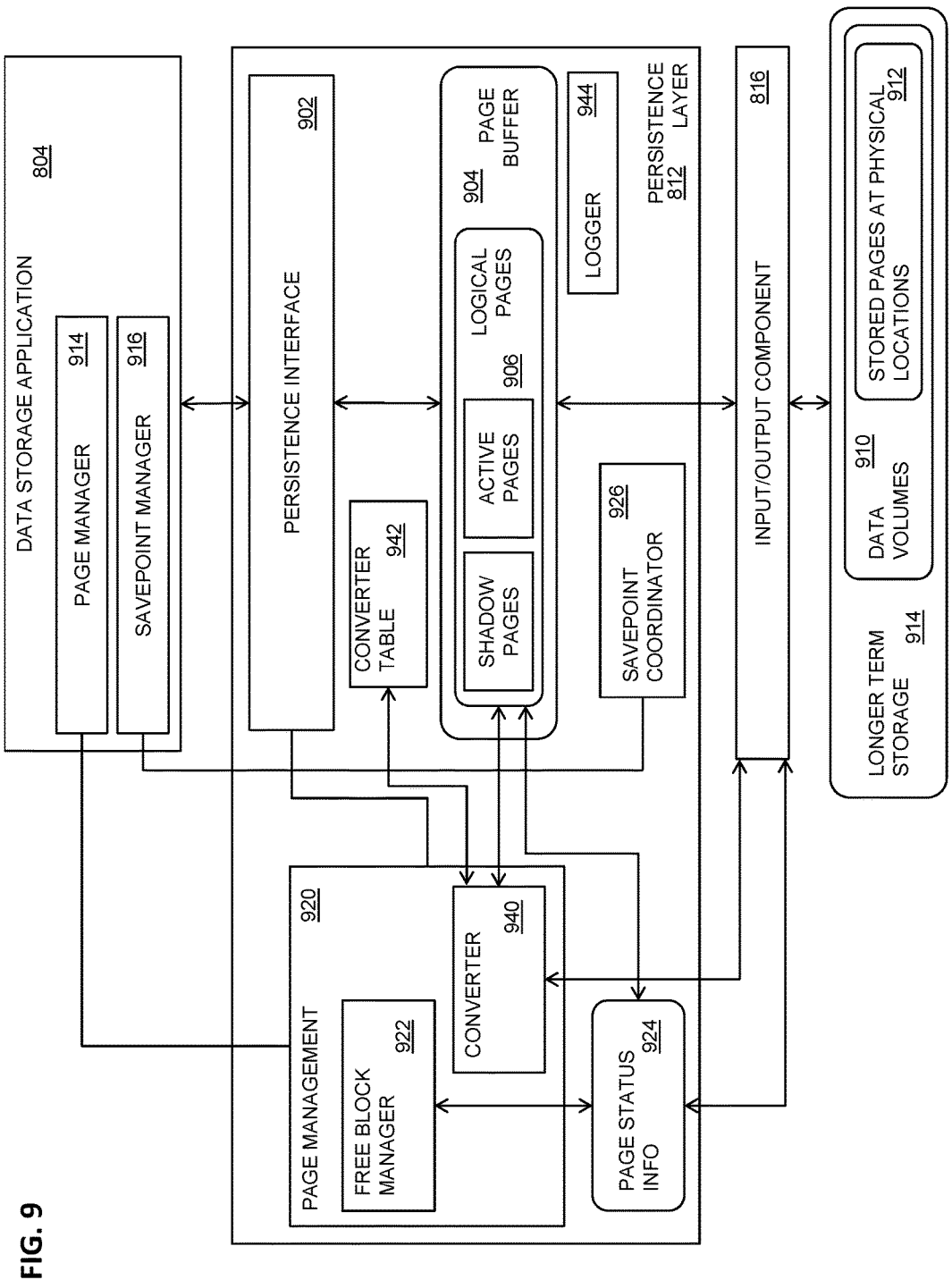
FIG. 9 is a diagram illustrating details of the system of FIG. 8.

FIG. 9 illustrates exemplary software architecture 900, according to some implementations of the current subject matter. A data storage application 804, which can be implemented in one or more of hardware and software, can include one or more of a database application, a network-attached storage system, or the like. According to at least some implementations of the current subject matter, such a data storage application 804 can include or otherwise interface with a persistence layer 812 or other type of memory buffer, for example via a persistence interface 902. A page buffer 904 within the persistence layer 812 can store one or more logical pages 906, and optionally can include shadow pages, active pages, and the like. The logical pages 906 retained in the persistence layer 812 can be written to a storage (e.g. a longer term storage, etc.) 814 via an input/output component 816, which can be a software module, a sub-system implemented in one or more of software and hardware, or the like. The storage 814 can include one or more data volumes 910 where stored pages 912 are allocated at physical memory blocks.

In some implementations, the data storage application 804 can include or be otherwise in communication with a page manager 914 and/or a savepoint manager 916. The page manager 914 can communicate with a page management module 920 at the persistence layer 812 that can include a free block manager 922 that monitors page status information 924, for example the status of physical pages within the storage 814 and logical pages in the persistence layer 812 (and optionally in the page buffer 904). The savepoint manager 916 can communicate with a savepoint coordinator 926 at the persistence layer 812 to handle savepoints, which are used to create a consistent persistent state of the database for restart after a possible crash.

In some implementations of a data storage application 804, the page management module of the persistence layer 812 can implement a shadow paging. The free block manager 922 within the page management module 920 can maintain the status of physical pages. The page buffer 904 can include a fixed page status buffer that operates as discussed herein. A converter component 940, which can be part of or in communication with the page management module 920, can be responsible for mapping between logical and physical pages written to the storage 814. The converter 940 can maintain the current mapping of logical pages to the corresponding physical pages in a converter table 942. The converter 940 can maintain a current mapping of logical pages 906 to the corresponding physical pages in one or more converter tables 942. When a logical page 906 is read from storage 814, the storage page to be loaded can be looked up from the one or more converter tables 942 using the converter 940. When a logical page is written to storage 814 the first time after a savepoint, a new free physical page is assigned to the logical page. The free block manager 922 marks the new physical page as "used" and the new mapping is stored in the one or more converter tables 942.

The persistence layer 812 can ensure that changes made in the data storage application 804 are durable and that the data storage application 804 can be restored to a most recent committed state after a restart. Writing data to the storage 814 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 944 can also be included to store the changes made to the data of the data storage application in a linear log. The logger component 944 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 944 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 812 can use a combination of undo log entries (from one or more logs) and shadow paging.

The persistence interface 902 can handle read and write requests of stores (e.g., in-memory stores, etc.). The persistence interface 902 can also provide write methods for writing data both with logging and without logging. If the logged write operations are used, the persistence interface 902 invokes the logger 944. In addition, the logger 944 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 944. For an entry of type "update", for example, this would be the identification of the affected record and the after image of the modified data.

When the data application 804 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 944 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 944 can write a database log (or simply referred to herein as a "log") sequentially into a memory buffer in natural order (e.g., sequential order, etc.). If several physical hard disks/storage devices are used to store log data, several log partitions can be defined. Thereafter, the logger 944 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 804 can use shadow paging so that the savepoint manager 916 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 10:
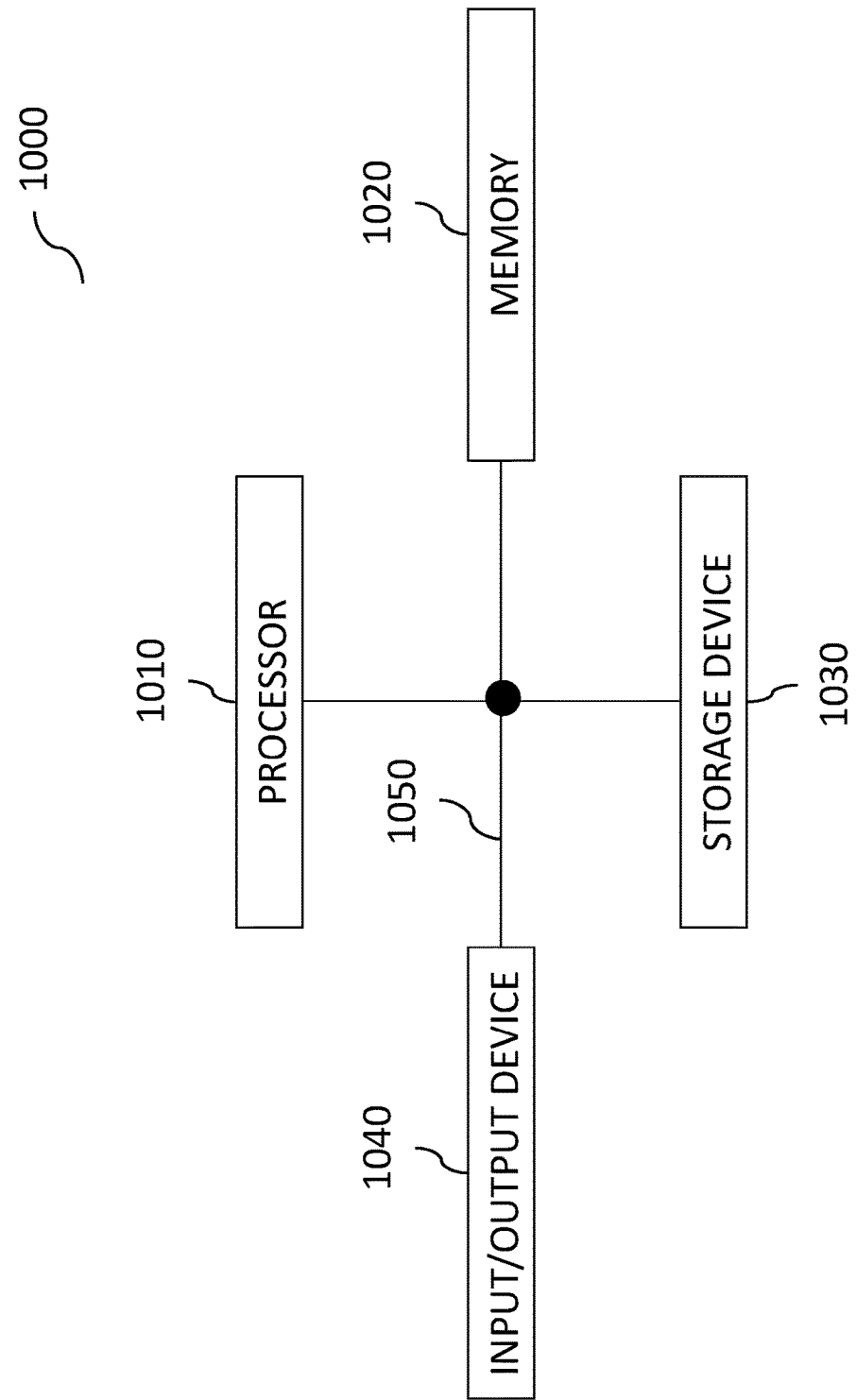
FIG. 10 is an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
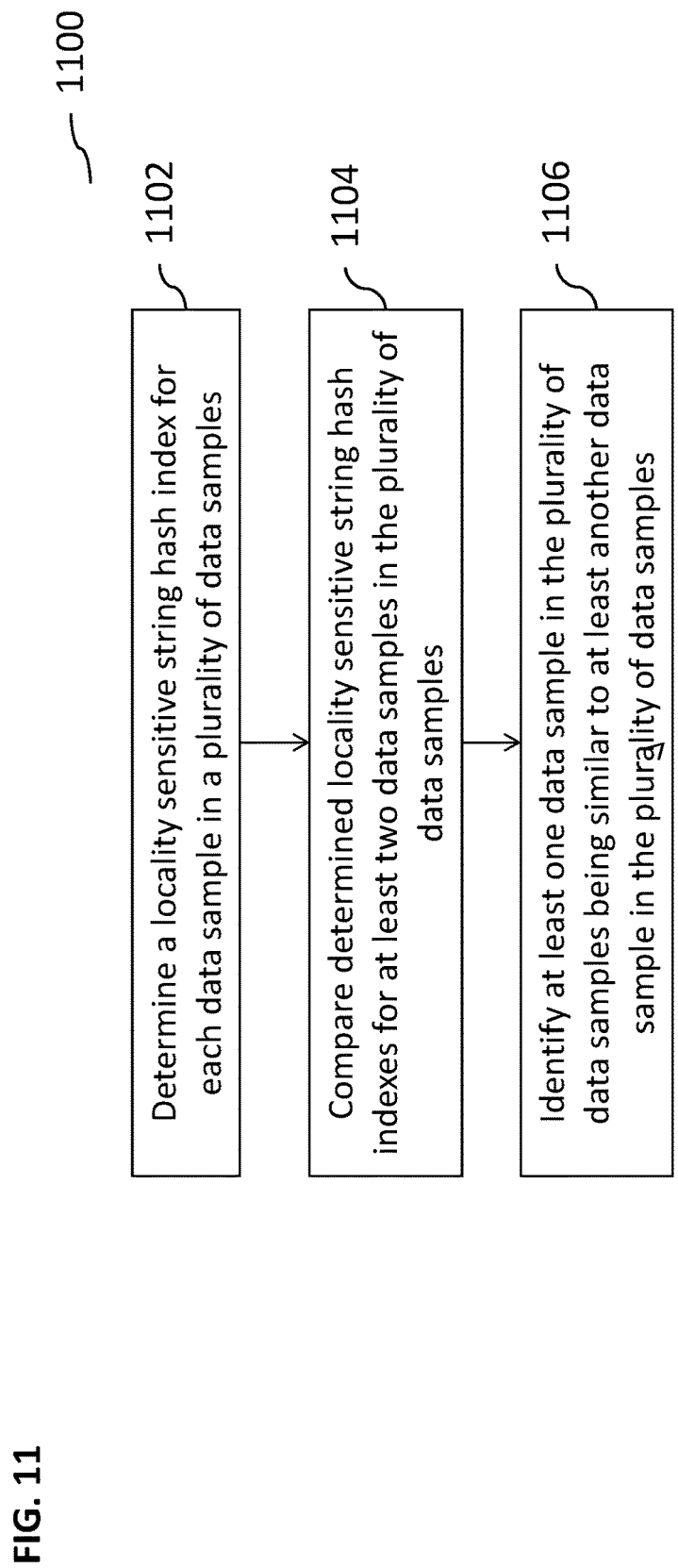
FIG. 11 is an exemplary method, according to some implementations of the current subject matter.

FIG. 11 illustrates an exemplary method 1100 for indexing data samples, according to some implementations of the current subject matter. At 1102, a locality sensitive string hash index can be determined for each data sample in a plurality of data samples (e.g., documents, emails, etc.). LSH hash can be determined using the processor 402 as shown in FIG. 4, where the processor can be disposed in one of the worker nodes 304 shown in FIG. 3. At 1104, the determined locality sensitive string hash indexes for at least two data samples in the plurality of data samples can be compared. The comparison can include estimating, based on the determined locality sensitive string hash indexes, a distance (e.g., a cosine distance) between the two data samples. At 1106, based on the comparison, at least one data sample in the plurality of data samples can be identified as being similar to at least another data sample in the plurality of data samples.

In some implementations, the current subject matter can include one or more of the following optional features. The method can also include generating an inverted word index for each data sample in the plurality of data samples, and executing, based on at least one keyword, at least one query for searching the plurality of data samples. The execution can include determining whether the keyword is included in the generated inverted word index.

In some implementations, at least one of the determining, the comparing, and the identifying can be performed using at least one distributed computing system (e.g., such as system 300 shown in FIG. 3).

In some implementations, the determination of a locality sensitive string hash index can include parsing the plurality of data samples, lemmatizing the parsed plurality of data samples, determining, based on the lemmatizing, at least one token corresponding to at least one lemma associated with the plurality of data samples, hashing, using the tokens, the plurality of parsed plurality of data samples, and identifying, based on the determining and the hashing, at least two similar data samples in the plurality of data samples.

In some implementations, the plurality of data samples can include at least one of the following: data, metadata, structured data, unstructured data, documents, email messages, text files, video, audio, graphics, and any combination thereof.

In some implementations, the method can also include generating a lifecycle graph for each data sample based on the estimated distances between the two data samples. The method can further include determining metadata associated with the two data samples, and refining the generated lifecycle graph based on the determined metadata. The metadata can include at least one of the following: a time stamp information, a recipient information, a sender information, a data sample format, a hidden content metadata, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   determining a locality-sensitive string hash index for each data sample in a plurality of data samples;
   comparing determined locality-sensitive string hash indexes for at least two data samples in the plurality of data samples, the comparing including estimating, based on the determined locality-sensitive string hash indexes, a distance between the at least two data samples;
   identifying, based on the comparing, at least one data sample in the plurality of data samples being similar to at least another data sample in the plurality of data samples;
   generating a lifecycle graph for each data sample based on the estimated distances between the at least two data samples;
   determining metadata associated with the at least two data samples; and
   refining the generated lifecycle graph based on the determined metadata;
   wherein the metadata including at least one of the following: a time stamp information, a recipient information, a sender information, a data sample format, a hidden content metadata, and any combination thereof;
   wherein at least one of the determining, the comparing, the identifying, the generating, the determining metadata, and the refining is performed on at least one processor of at least one computing system.

2. The method according to claim 1, further comprising
   generating an inverted word index for each data sample in the plurality of data samples; and
   executing, based on at least one keyword, at least one query for searching the plurality of data samples, the executing including determining whether the at least one keyword is included in the generated inverted word index.

3. The method according to claim 1, wherein at least one of the determining, the comparing, and the identifying is performed using at least one distributed computing system.

4. The method according to claim 1, wherein the determining further comprising
   parsing the plurality of data samples;
   lemmatizing the parsed plurality of data samples;
   determining, based on the lemmatizing, at least one token corresponding to at least one lemma associated with the plurality of data samples;
   hashing, using the tokens, the plurality of parsed plurality of data samples; and
   identifying, based on the determining and the hashing, at least two similar data samples in the plurality of data samples.

5. The method according to claim 1, wherein the plurality of data samples including at least one of the following: data, metadata, structured data, unstructured data, documents, email messages, text files, video, audio, graphics, and any combination thereof.

6. A system comprising:
   at least one programmable processor; and
   a machine-readable medium storing instructions that, when executed by the at least one programmable processor, cause the at least one programmable processor to perform operations comprising:
   determining a locality-sensitive string hash index for each data sample in a plurality of data samples;
   comparing determined locality-sensitive string hash indexes for at least two data samples in the plurality of data samples, the comparing including estimating, based on the determined locality-sensitive string hash indexes, a distance between the at least two data samples;
   identifying, based on the comparing, at least one data sample in the plurality of data samples being similar to at least another data sample in the plurality of data samples;
   generating a lifecycle graph for each data sample based on the estimated distances between the at least two data samples;
   determining metadata associated with the at least two data samples; and
   refining the generated lifecycle graph based on the determined metadata;
   wherein the metadata including at least one of the following: a time stamp information, a recipient information, a sender information, a data sample format, a hidden content metadata, and any combination thereof.

7. The system according to claim 6, wherein the operations further comprise
   generating an inverted word index for each data sample in the plurality of data samples; and
   executing, based on at least one keyword, at least one query for searching the plurality of data samples, the executing including determining whether the at least one keyword is included in the generated inverted word index.

8. The system according to claim 6, wherein at least one of the determining, the comparing, and the identifying is performed using at least one distributed computing system.

9. The system according to claim 6, wherein the determining further comprising
   parsing the plurality of data samples;
   lemmatizing the parsed plurality of data samples;
   determining, based on the lemmatizing, at least one token corresponding to at least one lemma associated with the plurality of data samples;
   hashing, using the tokens, the plurality of parsed plurality of data samples; and
   identifying, based on the determining and the hashing, at least two similar data samples in the plurality of data samples.

10. The system according to claim 6, wherein the plurality of data samples including at least one of the following: data, metadata, structured data, unstructured data, documents, email messages, text files, video, audio, graphics, and any combination thereof.

11. A computer program product comprising a non-transitory machine-readable medium storing instructions that, when executed by at least one programmable processor, cause the at least one programmable processor to perform operations comprising:
    determining a locality-sensitive string hash index for each data sample in a plurality of data samples;
    comparing determined locality-sensitive string hash indexes for at least two data samples in the plurality of data samples, the comparing including estimating, based on the determined locality-sensitive string hash indexes, a distance between the at least two data samples; and identifying, based on the comparing, at least one data sample in the plurality of data samples being similar to at least another data sample in the plurality of data samples;

generating a lifecycle graph for each data sample based on the estimated distances between the at least two data samples;

determining metadata associated with the at least two data samples; and refining the generated lifecycle graph based on the determined metadata;

wherein the metadata including at least one of the following: a time stamp information, a recipient information, a sender information, a data sample format, a hidden content metadata, and any combination thereof.

12. The computer program product according to claim 11, wherein the operations further comprise generating an inverted word index for each data sample in the plurality of data samples; and executing, based on at least one keyword, at least one query for searching the plurality of data samples, the executing including determining whether the at least one keyword is included in the generated inverted word index.

13. The computer program product according to claim 11, wherein at least one of the determining, the comparing, and the identifying is performed using at least one distributed computing system.

14. The computer program product according to claim 11, wherein the determining further comprising parsing the plurality of data samples;

lemmatizing the parsed plurality of data samples;

determining, based on the lemmatizing, at least one token corresponding to at least one lemma associated with the plurality of data samples;

hashing, using the tokens, the plurality of parsed plurality of data samples; and identifying, based on the determining and the hashing, at least two similar data samples in the plurality of data samples.

15. The computer program product according to claim 11, wherein the plurality of data samples including at least one of the following: data, metadata, structured data, unstructured data, documents, email messages, text files, video, audio, graphics, and any combination thereof.

* * * * *